United States Patent [19]
Ninomiya et al.

[11] Patent Number: 5,459,794
[45] Date of Patent: Oct. 17, 1995

[54] METHOD AND APPARATUS FOR MEASURING THE SIZE OF A CIRCUIT OR WIRING PATTERN FORMED ON A HYBRID INTEGRATED CIRCUIT CHIP AND A WIRING BOARD RESPECTIVELY

[76] Inventors: Takanori Ninomiya, Pearl Palace 302, Goten 1-30-21, Hiratsuka-shi, Kanagawa-ken; Hisae Yamamura, Sun Village Tommy 302, Konan 3-2-3, Konan-ku, Yokohama-shi, both of Japan

[21] Appl. No.: 91,381

[22] Filed: Jul. 15, 1993

[51] Int. Cl.[6] ............................. G06K 9/00; G01J 4/00; H04N 7/18
[52] U.S. Cl. .................. 382/145; 348/87; 348/126; 356/369; 356/400; 364/490; 364/559
[58] Field of Search ................... 356/369, 400, 356/394; 364/490, 491, 552, 559; 348/126, 87; 382/8

[56] References Cited

U.S. PATENT DOCUMENTS

| | | |
|---|---|---|
| 4,866,629 | 9/1989 | Chen et al. ................... 382/8 |
| 4,922,308 | 5/1990 | Noguchi et al. ............... 382/8 |
| 5,050,111 | 9/1991 | Ayata et al. .................. 382/8 |
| 5,127,061 | 6/1992 | Amir et al. ................... 382/8 |

*Primary Examiner*—Leo H. Boudreau
*Attorney, Agent, or Firm*—Antonelli, Terry, Stout & Kraus

[57] ABSTRACT

A measuring method and apparatus for automatically and accurately measuring the sizes of portions of a hybrid integrated circuit chip and circuit patterns formed thereon or a wiring board and wiring patterns formed thereon. An image of a portion of a hybrid integrated circuit chip or wiring board is obtained through a TV camera which provides image signals representing images including those of objective portions. The image signals are processed to calculate the positions of the objective portions automatically. The size of an arbitrary objective portion is determined from a difference between respective positions of other objective portions.

34 Claims, 10 Drawing Sheets

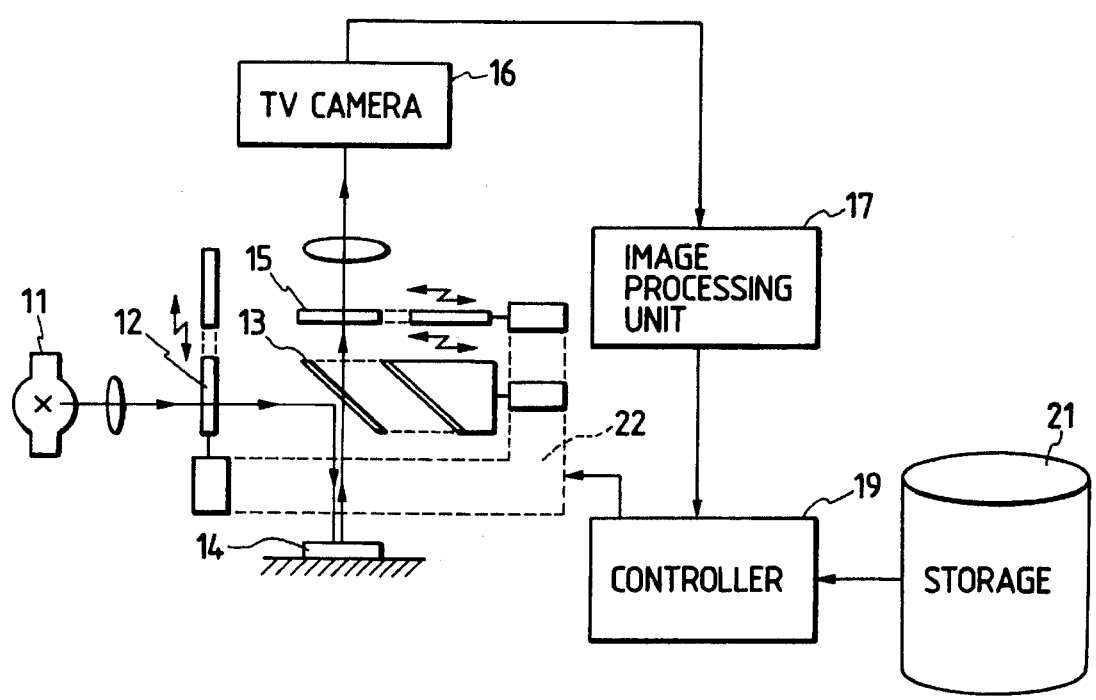

BACKGROUND PIXEL

PATTERN PIXEL

METHOD AND APPARATUS FOR MEASURING THE SIZE OF A CIRCUIT OR WIRING PATTERN FORMED ON A HYBRID INTEGRATED CIRCUIT CHIP AND A WIRING BOARD RESPECTIVELY

TECHNICAL FIELD

The present invention relates to a method and apparatus for measuring the size of a circuit pattern. More particularly, the present invention relates to a method and apparatus for automatically measuring the size of a hybrid integrated circuit chip and the size and position of an organic thin-film circuit pattern of a hybrid integrated circuit formed on the hybrid integrated circuit chip, a method and apparatus for sorting hybrid integrated circuit chips on the basis of measured values of portions of the hybrid integrated circuit and a method and apparatus for automatically measuring the size of a wiring board and the size of a pattern formed on the wiring board and automatically determining the position of the pattern on the wiring board.

BACKGROUND OF THE INVENTION

Presently optical microscopes have been used for the visual measurement of the size of a chip and the size and position of a circuit pattern formed on the chip and the size of a wiring board and the size and position of the wiring pattern formed thereon. When measuring the size of a chip or a circuit pattern formed on the chip or the size of a wiring board or the size and position of the wiring pattern formed thereon by using an optical microscope, the moving stage of the optical microscope mounted with the chip or wiring board is operated to move the chip or wiring board so that an edge of the chip or wiring board or a contour of the circuit pattern or wiring pattern coincides with a thin vertical line formed in the field of the optical microscope, i.e., a marker. The position of the chip or wiring board is determined from the position of the moving stage when the marker is positioned as described. Such a measuring procedure is carried out repeatedly to determine the virtual positions of measuring points, and the distance between the measuring points and the relative positions between the objective portions are determined by calculation.

A measuring apparatus comprising an image signal detector and an image processor, and an inspecting apparatus disclosed in Japanese Patent Laid-open Patent Application (Kokai) No. 63-122229 have been proposed to carry out the foregoing measuring procedure automatically.

When measuring the chip or the circuit pattern formed on the chip, the wiring board or the wiring pattern formed on the wiring board through visual observation using an optical microscope, the contours of objective portions are recognized visually and the visual recognition of the contours need to be repeated by the number of times equal to that of the objective portions. Consequently, measurement using the above-described operation requires a lot of time, the measuring accuracy is dependent on the skill of the operator, and the measuring accuracy deteriorates with the progressive fatigue of the operator.

The conventional automatic measuring and inspecting apparatus for hybrid integrated circuit chips and patterns thereon operates using only one image signal detecting system among a bright field illumination system. Either a fluorescence detecting system, illustrated for example by U.S. Pat. Nos. 4,816,686 and 4,772,125, or a polarized light detecting system, illustrated for example by Japanese Laid-Open Patent Application Nos. 59-231402, 1-263540 and 2-71377. Thus, using such an illumination system further makes it difficult to form satisfactory images of all the objective portions of a circuit pattern formed on a hybrid integrated circuit chip provided with a hybrid integrated circuit by the conventional automatic measuring apparatus or the conventional inspecting apparatus.

Hybrid integrated circuit chips are chips having a ceramic base and an organic thin-film circuit pattern thereon. The thin-film circuit pattern may be in multiple layers. Such chips are used in the recently developed packaging technology known as controlled collapse chip connection (C4) and micro carrier for LSI chip (MCC). The C4 and MCC packaging technologies, illustrated for example in *LSI Packaging Technology for Mainframe Computers*, by K. Takeda, et al., IEICE Trans., vol. E74, No. 8, August 1991 and *Micro Carrier for LSI Chip Used in the HITACM-880 Processor Group*, by T. I. Morie, et al., Proceedings for 41st ECT Conference, May 1991, require the dimensions of the chip to be held to strict tolerances. Thus the measurement of the dimensions of the features of the chip are critical. Therefore, it is difficult to apply the conventional measuring apparatus to the measurement of the circuit pattern formed on the chip for forming a hybrid integrated circuit and obtain the level of accuracy needed for the above-described packaging technology.

Recently, the size of the wiring board and the density of elements formed on the wiring board have been progressively increased. When the wiring board is relatively large, measurement in a sufficiently high accuracy cannot be achieved by using a single image of the entire wiring board and a large amount of data needs to be processed. Therefore, the measuring apparatus must be provided with hardware of a large scale including an image storage device, which makes the measuring apparatus expensive and the measuring apparatus needs much time to process the image.

SUMMARY OF THE INVENTION

It is a first object of the present invention to provide a measuring method and apparatus capable of quickly, automatically and accurately measuring the size of a hybrid integrated circuit chip and the size and position of a circuit pattern formed on the chip, and an apparatus for carrying out the measuring method.

A second object of the present invention is to provide a measuring method and apparatus capable of quickly, automatically and accurately measuring the size of a hybrid integrated circuit chip provided with a hybrid integrated circuit and the size and position of a circuit pattern formed on the chip even if the chip is large, and an apparatus for carrying out the measuring method.

A third object of the present invention is to provide a measuring and sorting method and apparatus capable of quickly, automatically and accurately measuring the size of a hybrid integrated circuit chip provided with a hybrid integrated circuit and the size and position of a circuit pattern formed on the chip, and of sorting chips on the basis of measured values, and an apparatus for carrying out the measuring and sorting method.

A fourth object of the present invention is to provide a measuring and sorting method and apparatus capable of quickly, automatically and accurately measuring the size of a hybrid integrated circuit chip provided with a hybrid integrated circuit and the size and position of a circuit pattern formed on the chip even if the chip is large, and of sorting chips on the basis of the measured values, and an apparatus for carrying out the measuring and sorting method.

A fifth object of the present invention is to provide a measuring method and apparatus capable of quickly, automatically and accurately measuring the size of a wiring board, and the size and position of a wiring pattern formed on the wiring board.

A sixth object of the present invention is to provide a measuring method and apparatus which can acquire a plurality of partial images of sections of a wiring board to permit measurement of the objective portions thereof when the wiring board is large.

The first object can be achieved by the present invention by providing a method of measuring the sizes of objective portions of a hybrid integrated circuit chip of a ceramic material provided with an organic thin-film circuit pattern thereon.

The method for achieving the first object includes the steps of obtaining a first image of the hybrid integrated circuit chip by illuminating the hybrid integrated circuit chip with linearly polarized light and detecting the reflected light having a direction of vibration perpendicular to that of the linearly polarized light, obtaining a second image of the hybrid integrated circuit chip by illuminating the hybrid integrated circuit chip with monochromatic light having a short wavelength and detecting the fluorescence produced by the hybrid integrated circuit chip and having a wavelength longer than that of the monochromatic light and selecting either the first image or the second image suitable for detecting the image on either one or the other of image signal detecting systems specified beforehand respectively for a plurality of objective portions of the hybrid integrated circuit chip.

The method for achieving the first object also includes the steps of calculating the positions of the objective portions in the selected image on the basis of the selected image, converting the coordinates of the positions of the objective portions in the image into those of an absolute coordinate system on the basis of the relation between the coordinates of the objective portions in the first and second images, determined beforehand and the coordinates of the same on the absolute coordinate system and determining the size of an optional portion by calculating the difference between the respective absolute coordinates of two optional objective portions. The first object can also be achieved by an apparatus which carries out the above-described method.

The second object can be achieved by a method of measuring the sizes of objective portions of a hybrid integrated circuit chip of a ceramic material provided with an organic thin-film circuit pattern thereon.

The method for achieving the second object includes the steps of moving the hybrid integrated circuit chip to position objective portions of the hybrid integrated circuit chip at a measuring position and obtaining partial images of portions of the hybrid integrated circuit chip, including the objective portions, on either a polarized light illumination/detection system or a fluorescence detection system. The polarized light illumination detection system illuminates the hybrid integrated circuit chip with linearly polarized light and converts the reflected light having a direction of vibration perpendicular to that of the linearly polarized light into electrical image signals. The fluorescence detection system illuminates the hybrid integrated circuit chip with monochromatic light having a short wavelength, and converts the fluorescence produced by the hybrid integrated circuit chip and having a wavelength longer than that of the monochromatic light into electrical image signals.

The method for achieving the second object also includes the steps of calculating the positions of the objective portions in the partial images on the basis of the partial images, converting the positions of the objective portions in the partial images into corresponding coordinates on an actual coordinate system on the basis of the relation between positions in the partial images measured beforehand for the polarized light illumination/detection system and the fluorescence detection system, and actual coordinates and determining the size of an optional portion by calculating the difference between the coordinates of two optional objective portions on the actual coordinate system and the positions of the partial images. The present invention also provides an apparatus for carrying out the method for achieving the second object.

The third object can be achieved by a method of examining objective portions of a hybrid integrated circuit chip of a ceramic material provided with an organic thin-film circuit pattern thereon to see if the size of each objective portion is within an allowable range of size.

The method of the present invention for achieving the third object includes the steps of obtaining a first image of the hybrid integrated circuit chip by illuminating the hybrid integrated circuit chip with linearly polarized light and detecting the reflected light having a direction of vibration perpendicular to that of the linearly polarized light, obtaining a second image of the hybrid integrated circuit chip by illuminating the hybrid integrated circuit chip with monochromatic light having a short wavelength and detecting the fluorescence produced by the hybrid integrated circuit chip and having a wavelength longer than that of the monochromatic light and selecting either the first image or the second image suitable for detecting the image on either one or the other of image signal detecting systems specified beforehand respectively for a plurality of objective portions of the hybrid integrated circuit chip.

The method for achieving the third object also includes the steps of calculating the positions of the objective portions in the selected image on the basis of the selected image, converting the coordinates of the positions of the objective portions in the image into those of an absolute coordinate system on the basis of the relation between the coordinates of the objective portions in the first and second images, determined beforehand and the coordinates of the same on the absolute coordinate system, determining the size of an optional portion by calculating the difference between the respective coordinates of two optional objective portions and deciding whether or not the size is within an allowable range of size. The present invention also provides an apparatus for carrying out the method for achieving the third object.

The fourth object can be achieved by a method of examining objective portions of a hybrid integrated circuit chip of a ceramic material provided with an organic thin-film circuit pattern thereon to see if the size of each objective portion is within an allowable range of size.

The method for achieving the fourth object includes the steps of moving the hybrid integrated circuit chip to position objective portions of the hybrid integrated circuit chip at a measuring position and obtaining partial images of portions of the hybrid integrated circuit chip, including the objective portions, on either a polarized light illumination/detection system or a fluorescence detection system. The polarized light illumination/detection system illuminates the hybrid integrated circuit chip with linearly polarized light and converts the reflected light having a direction of vibration perpendicular to that of the linearly polarized light into electrical image signals. The fluorescence detection system illuminates the hybrid integrated circuit chip with monochromatic light having a short wavelength and converts the fluorescence produced by the hybrid integrated circuit chip and having a wavelength longer than that of the monochromatic light into electrical signals.

The method for achieving the fourth object also includes the steps of calculating the positions of the objective portions in the partial images, converting the positions of the objective portions in the partial images into corresponding coordinates on an actual coordinate system on the basis of the relation between positions in the partial images measured beforehand for the polarized light illumination/detection system and the fluorescence detection system, and actual coordinates, determining the size of an optional portion by calculating the difference between the coordinates of two optional objective portions on the actual coordinate system and the positions of the partial images and deciding whether or not the size is within an allowable range of size. The present invention also provides an apparatus for carrying out the method for achieving the fourth object.

In the methods and apparatuses for achieving the first through fourth objects the image of ceramic portions of the hybrid integrated circuit chip is obtained on a polarized light illumination/detection system and the image of the organic thin-film circuit pattern is obtained principally on a fluorescence detection system. The images of the objective portions enlarged and formed on those systems are formed by a TV camera. Image signals provided by the TV camera are processed and the objective positions on the hybrid integrated circuit chip are calculated automatically, and the size of am optional portion is determined by calculating the difference between the objective positions.

The fifth object can be achieved by a method which includes the steps of acquiring an enlarged image of a measuring object by a TV camera, processing the enlarged image to extract an objective portion automatically from the enlarged image, calculating the position of the objective portion and determining the size of the objective portion on the basis of the calculated position. The present invention also provides an apparatus for carrying out the method for achieving the fifth object.

In the method and apparatus for achieving the fifth object an object portion is extracted and the size of the objective portion is calculated by processing the image by a predetermined procedure according to predetermined standards. Accordingly, accurate measurement can be quickly achieved with high reproducibility.

The sixth object can be achieved by a method which includes the step of acquiring a plurality of partial images of sections of a wiring board, respectively including objective portions and calculating the size of each objective portion on the basis of the position of the objective portion in the partial image and the position of the partial image. The objective portion is extracted automatically from the image basically by determining a reference point on one of the contours of a pattern in the image, determining the approximate position of the objective portion on the basis of the coordinates of the reference point and addressing data and searching for the pattern starting from the approximate position of the objective portion. The present invention also provides an apparatus for carrying out the method for achieving the sixth object.

BRIEF DESCRIPTION OF THE DRAWINGS

FIG. 1 is a block diagram of a measuring apparatus for measuring an integrated circuit chip, in a first embodiment according to the present invention;

DETAILED DESCRIPTION OF THE PREFERRED EMBODIMENTS

Prior to the concrete description of the first embodiment of the present invention, the principle on which the first embodiment is based will be explained.

Figure 2A:
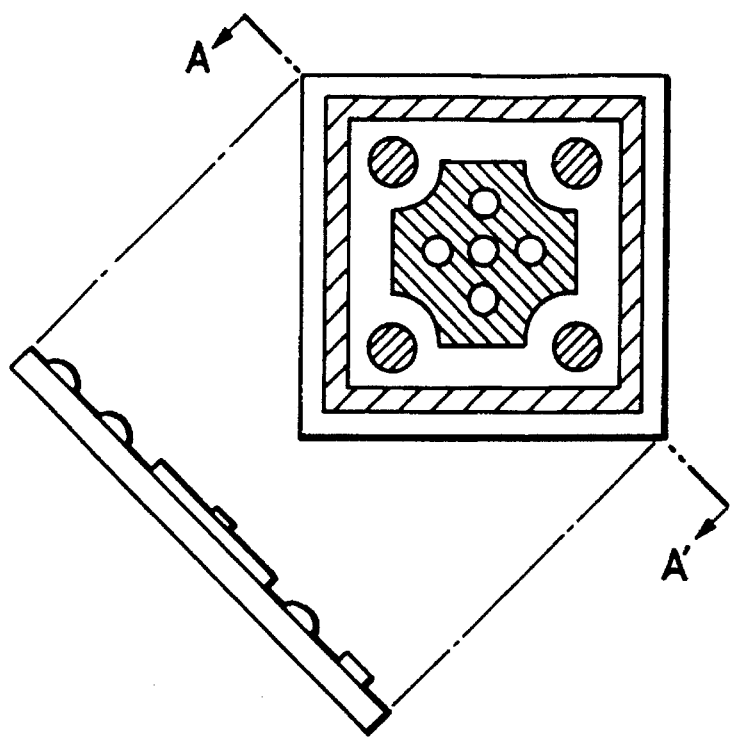
FIGS. 2A, 2B and 2C are plan and sectional views taken on line A—A of a hybrid integrated circuit chip, a plan view of a polarization image formed on a polarized light illumination/detection system, and a plan view of a fluorescence image formed on a fluorescence detection system, respectively.
Figure 2B:
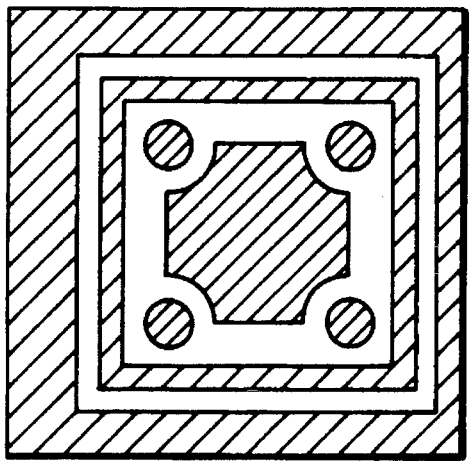
Figure 2C:
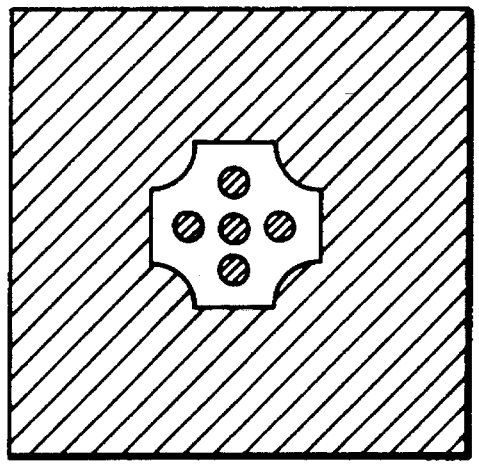

FIG. 2A shows a hybrid integrated circuit chip in accordance with the present invention provided with a hybrid integrated circuit in a plan view and a sectional view taken on line A—A. FIG. 2B shows an image of the hybrid integrated circuit chip obtained on a polarized light illumination/detection system. FIG. 2C shows an image of the hybrid integrated circuit chip obtained on a fluorescence detection system.

When obtaining an image of the hybrid integrated circuit chip on the polarized light illumination/detection system, the hybrid integrated circuit chip is illuminated with illuminating linearly polarized light, and only the reflected light having a direction of vibration perpendicular to that of the illuminating linearly polarized light is detected selectively. When obtaining an image on this image signal detecting system, the illuminating light falling on exposed portions of the surface of the ceramic chip is diffused and the direction of polarization of the illuminating light is disturbed, and hence the reflected light consists of polarized components having all directions of vibration. There fore, a quantity of light exceeding a certain value can be obtained even if only the polarized component having a direction of vibration perpendicular to that of the illuminating linearly polarized light is detected selectively.

Since the polarization of the illuminating linearly polarized light falling on the metallic circuit pattern is disturbed scarcely, the reflected light does not have any polarized component having a direction of vibration perpendicular to that of the illuminating linearly polarized light. Accordingly, in the image obtained on the polarized light illumination/ detection system, portions corresponding to the exposed surface of the ceramic chip is bright and portions corresponding to the metallic circuit pattern is relatively dark. Thus, the image has satisfactory contrast.

When obtaining an image of the hybrid integrated circuit chip on the fluorescence detection system, the hybrid integrated circuit chip is illuminated with illuminating light having a short wavelength and only fluorescence having a long wavelength caused by excitation is detected. Fluorescence is produced by exposed portions of an insulating organic resin layer and fluorescence is not produced by exposed portions of the metallic circuit pattern and the surface of the ceramic chip. Therefore, portions of the image corresponding to the exposed portions of the insulating organic resin layer are bright and portions of the image corresponding to the exposed portions of the metallic circuit pattern and the surface of the ceramic chip are dark.

Accordingly, either the polarized light illumination/detection system or the fluorescence detection system is used selectively according to the characteristics of the objective portions to obtain images having satisfactory contrast, and the sizes of the objective portions are determined from the images. An image obtained on the polarized light illumination/detection system and an image obtained on the fluorescence detection system differ from each other in magnification and the coordinates of the center due to the color aberration and dislocation of the optical axis in the optical detection systems. Such differences are measured and data representing these differences is stored beforehand, and the sizes and positions of the objective portions determined from the images are corrected by using the data. Accordingly, the sizes of the objective portions on the surface of the ceramic chip and the organic thin-film circuit pattern can be accurately and automatically measured. Since the measuring objects are extracted by a specified image processing procedure according to a predetermined criteria, and then the sizes of the measuring objects are calculated. Accordingly, all the measuring objects on the hybrid integrated circuit chip can be measured in high accuracy and satisfactory reproducibility without requiring much time.

The present invention will now be described in detail in terms of the first embodiment thereof.

First, a measuring apparatus for measuring the size of a circuit pattern formed on a chip, of the first embodiment according to the present invention will be described. Referring to FIG. 1, illuminating light emitted by a light source 11, such as a mercury lamp, travels through an optical filter 12, one of two filters which can be alternately positioned in place, and is reflected by a half mirror 13, i.e., one of two half mirrors which can be alternately positioned in place, so as to fall on the surface of a hybrid integrated circuit chip 14, i.e., a measuring object. Reflected light reflected by the surface of the hybrid integrated circuit chip 14 travels through the half mirror 13, an optical filter 15, i.e., one of two optical filters which can be alternately positioned in place, and falls on a TV camera 16. Then, the TV camera 16 produces image signals representing the hybrid integrated circuit chip 14. The image signals provided by the TV camera 16 are sampled in synchronism with clock signals of a predetermined frequency and converted into multivalued digital signals, i.e., image density data. The multivalued digital signals are stored temporarily in an image processing unit 17.

The image processing unit 17 processes the image density data by a specified image processing procedure, which will be described later, to calculate the position of the measuring object in the image. A controller 19, which controls the operation of the measuring apparatus, changes the combination of the optical filters 12 and 15 and the half mirror 13 to obtain successively two kinds of images of the hybrid. integrated circuit chip 14, i.e., a polarization image, namely, an image obtained by an imaging operation on the polarized light illumination/detection system, and a fluorescence image, namely, an image obtained by an imaging operation on the fluorescence detection system. The image processing unit 17 processes the polarization image and the fluorescence image to determine the positions of objective portions in the two kinds of images and determines the sizes of the objective portions on the hybrid integrated circuit chip 14 from the positions of the objective portions. The controller 19 is, for example, a computer system including a microprocessor. The controller 19 is provided with a storage device 21 storing the size of pixels, data representing the dislocation of one of the polarization image and the fluorescence image from the other, and the approximate positions (windows) of the objective portions in the images.

Figure 3:
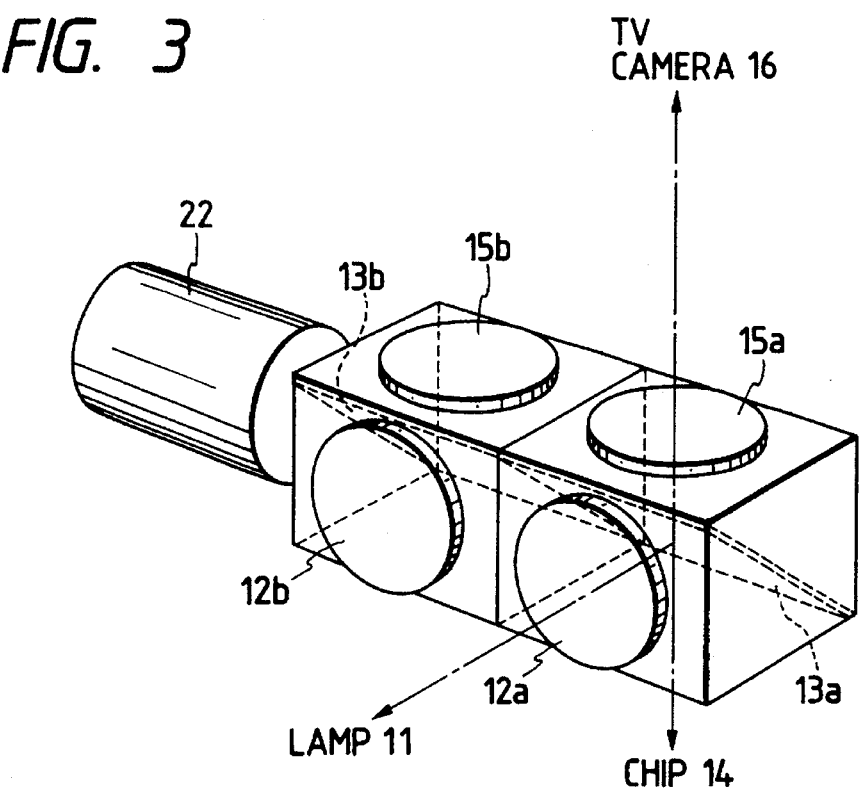
FIG. 3 is a perspective view of a filter unit comprising optical filters and half mirrors, and included in the measuring apparatus of FIG. 1.

The optical filters 12 and 15 and the half mirrors 13 will be described hereinafter. Referring to FIG. 3, a filter unit consists of a first filter unit comprising polarizing plates 12a and 15a and a half mirror 13a, and a second filter unit comprising a band-pass filter 12b, a colored glass filter 15b and a dichroic mirror 13b. The controller 19 controls a moving mechanism 22 to position either the first filter unit or the second filter unit on the light path by the moving mechanism 22 when obtaining either the fluorescence image or the polarization image. The first filter unit comprising the polarizing plates 12a and 15a and the half mirror 13a is positioned on the light path as shown in FIG. 3 to obtain the polarization image. The second filter unit comprising the band-pass filter 12b, the colored glass filter 15b and the dichroic mirror 13b is positioned on the light path to obtain the fluorescence image.

When the filter unit is set in a state as shown in FIG. 3 for obtaining the polarization image, the illuminating light is converted into linearly polarized light by the polarizing plate 12a, the linearly polarized light is reflected by the half mirror 13a onto the surface of the hybrid integrated circuit chip 14. When the hybrid integrated circuit chip 14 is thus illuminated with the linearly polarized light, a portion of the reflected light reflected by the hybrid integrated circuit chip 14, transmitted through the half mirror 13a travels through the polarizing plate 15a disposed with its polarizing direction perpendicular to the polarizing direction of the polarizing plate 12a and falls on the TV camera 16. The TV camera provides image signals representing the polarization image. The polarizing plate 12a is set to make S-polarized light fall on the half mirror 13a, and the polarizing plate 15a is set to pass P-polarized light transmitted through the half mirror 13a. When the polarizing plate 12a is not set to make S-polarized light fall on the half mirror 13a, the illuminating light reflected by the half mirror 13a is elliptically polarized light. and, consequently, the degree of contrast of the image is reduced.

When the second filter unit for obtaining the fluorescence image is set on the light path, the band-pass filter 12b having a center transmission wavelength of, for example, 450 nm allows only monochromatic light of a short wavelength in a specified wavelength range out of the illuminating light to travel therethrough and fall on the dichroic mirror 13b. For example, if the dichroic mirror 13b reflects light of wavelengths shorter than 500 nm and transmits light of wavelengths not shorter than 500 nm, the hybrid integrated circuit chip 14 is illuminated with light of wavelengths shorter than 500 nm. Fluorescence of a long wavelength produced by the hybrid integrated circuit chip 14 travels through the dichroic mirror 13b and the colored glass filter 15b which transmits, for example, light of wavelengths not shorter than 550 nm and falls on the TV camera 16. Then, the TV camera 16 provides image signals representing a fluorescence image.

If an Ar laser that emits linearly polarized light of 488 nm in wavelength is used as the light source 11 instead of the mercury lamp, the measuring apparatus need not be provided with the polarizing plate 12a and the band-pass filter 12b. The TV camera 16 may be substituted by a two-dimensional image detector other than TV cameras. A highly sensitive storage TV camera, in particular, provides image signals having a high SN ratio. The magnification of the imaging system, i.e., the size of a pixel, is determined according to required accuracy. The image processing unit 17 may be an image processing device of any configuration which includes a microprocessor for carrying out image processing software or hardware capable of carrying out part of or all the image processing procedure, provided that the image processing device is provided with an image memory capable of storing density data representing the image of the hybrid integrated circuit chip.

In operation, the controller 19 controls the moving mechanism 22 to set the optical filters 12 and 15 and the half mirror 13 to obtain the polarization image, the TV camera 16 provides density data, i.e., image signals representing the polarization image of the hybrid integrated circuit chip 14, and the image processing unit 17 stores the density data temporarily. Then, the image processing unit 17 carries out the following image processing procedure to calculate the respective positions of measuring portions.

Figure 5:
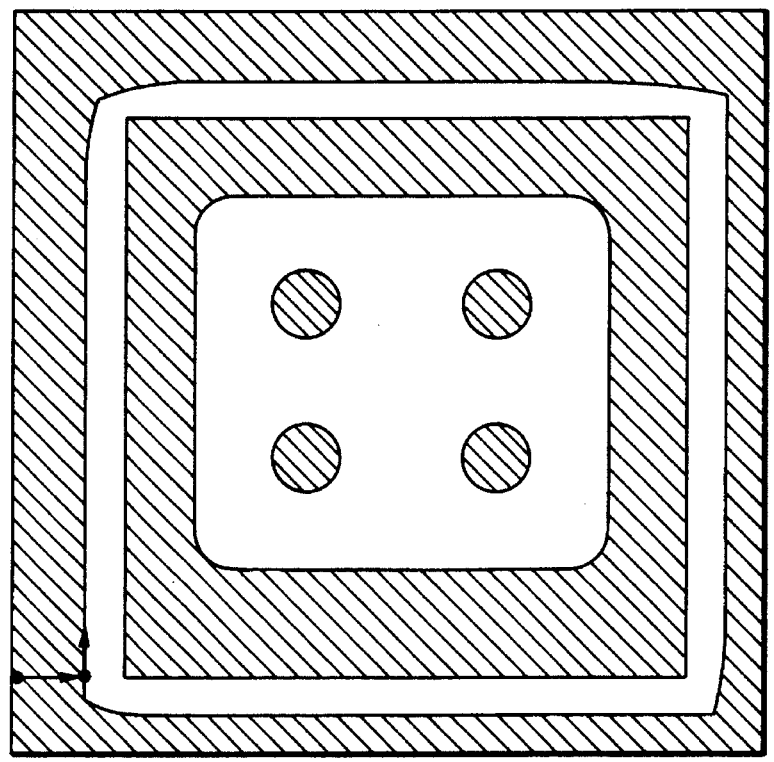
FIG. 5 is a pictorial view of assistance in explaining an initial image processing procedure for setting a reference point.
Figure 4:
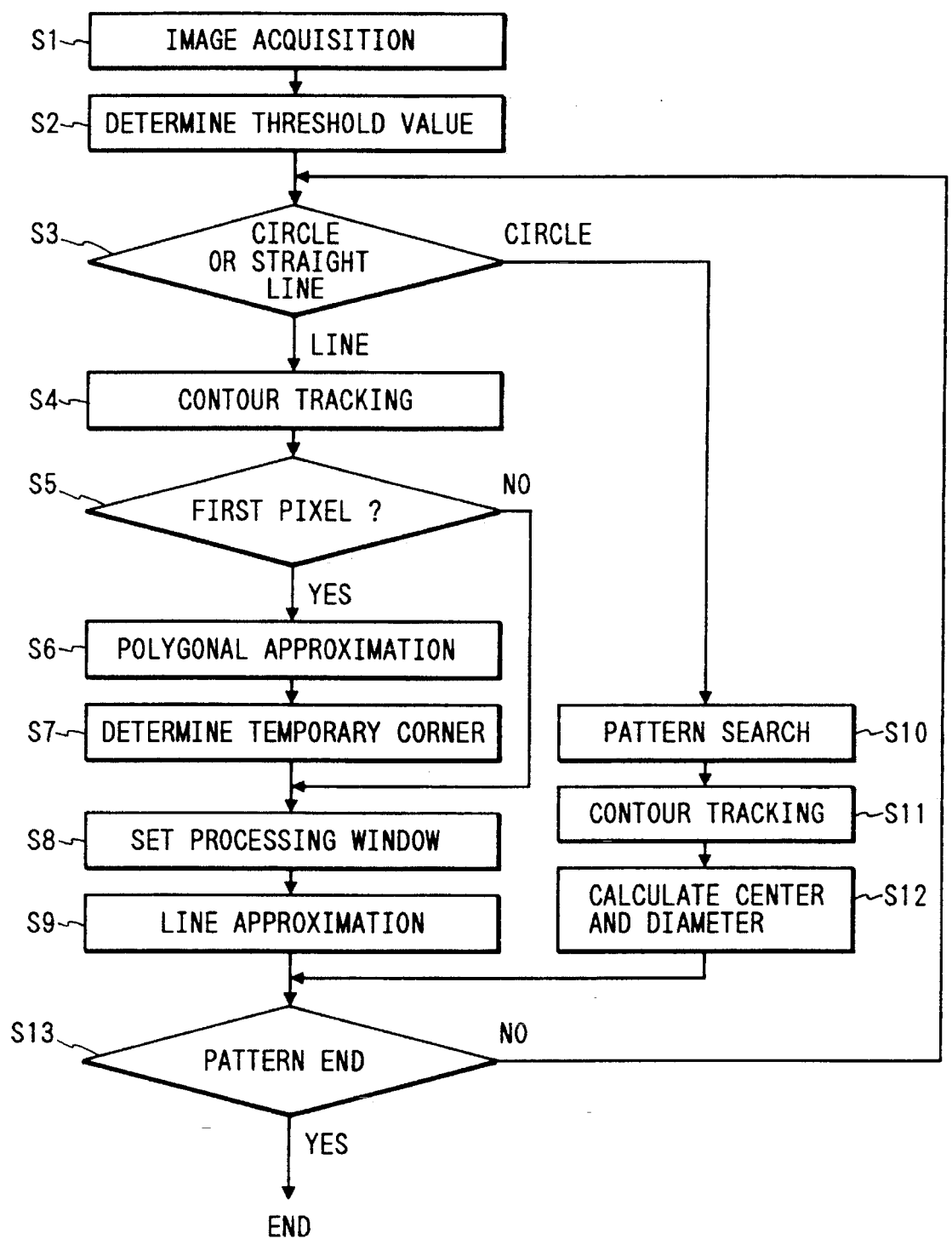
FIG. 4 is a flow chart of an image processing procedure according to the present invention.

FIG. 4 shows the image processing procedure of the first embodiment of the present invention including the following steps. A frequency distribution curve, i.e., a histogram, of densities is obtained from the density data of the image of the entire hybrid integrated circuit chip or a part of the same image including an objective portion in other words, the image is acquired (step S1). An optimum threshold density for binarization is determined (step S2). Then, the contour of the circuit pattern is traced to set a reference point such as a corner. Particularly, the above-described procedure traces the contour of a cross pattern in the outermost region (steps S3 and S4). As shown in FIG. 5, the density data of each pixel is examined in an inward sequence from a point on the outer edge of the hybrid integrated circuit chip, a first pixel of a density higher than (or lower than) the threshold density is assigned to a starting point, and then the tracing of the contour is started. Contour tracking can be accomplished as disclosed, for example, in U.S. Pat. No. 5,157,736.

Figure 6A:
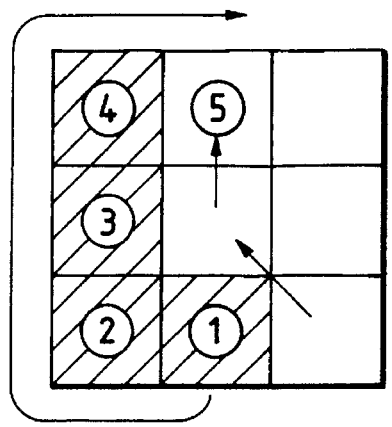
FIGS. 6A, 6B and 6C are diagrams illustrating the method of tracing a contour.
Figure 6B:
Figure 6C:

As shown in FIGS. 6A–C, eight pixels (or four pixels) around an objective pixel are examined successively in a clockwise sequence or a counterclockwise sequence starting from a pixel immediately before the objective pixel, a first pixel of a density higher than (or lower than) the threshold density is assigned to the next objective pixel, and then the coordinates of the objective pixels are stored in a sequence of points of the contour. The foregoing steps are repeated in a specified region.

Figure 7:
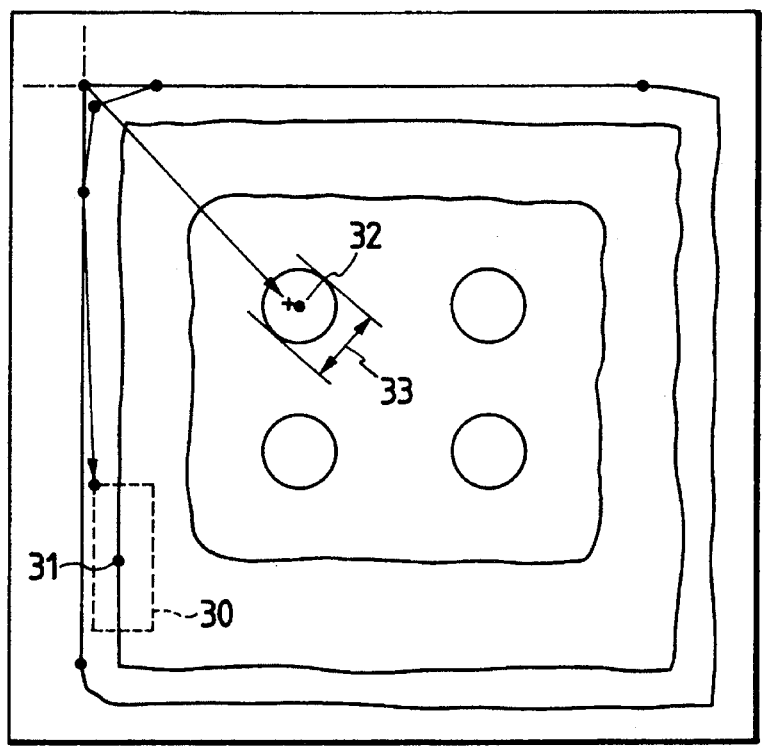
FIG. 7 is a diagrammatic view illustrating the method of determining the position of an objective portion in an image.

After the tracing of the contour, the contour is approximated by a polygonal line (step S6) as shown in detail in FIG. 7. The intersection point of the respective extensions of a portion of the polygonal line inclined at an angle smaller than a reference value to the horizontal line and a portion of the polygonal line inclined at an angle smaller than a reference value to the vertical line is assigned to a temporary corner (step S7). If this is the first pixel being evaluated then steps S6 and S7 are skipped (step S5).

The temporary corner is used as a reference point for determining the positions of objective portions in the image. That is, a measuring range in the image is determined on the basis of distances for objective portions from the temporary corner (step S8), stored beforehand in the storage device 21, and then measurement is carried out. For example, if the measuring portion is a straight portion, such as the edge of the hybrid integrated circuit chip or a portion of the circuit pattern, a rectangular measuring window 30 including the objective portion is determined in the image by the foregoing procedure. A contour line in the window 30 is detected, the contour line is approximated by a straight line (step S9), the coordinates of the middle point 31 on the straight line included in the measuring window 30 is assigned to a position in the image of the objective portion. If the objective portion has a circular shape (step 53), the contour of a pattern including a starting point determined with reference to the temporary corner by the foregoing procedure is traced to determine, for example, the centroid 32 of the image of the objective portion and the diameter 33 is calculated on the basis of the area of the pattern (steps S10–S12). Thereafter the end of the pattern is detected (step S13). If the end is not detected then steps S3–S12 are repeated.

Figure 8:
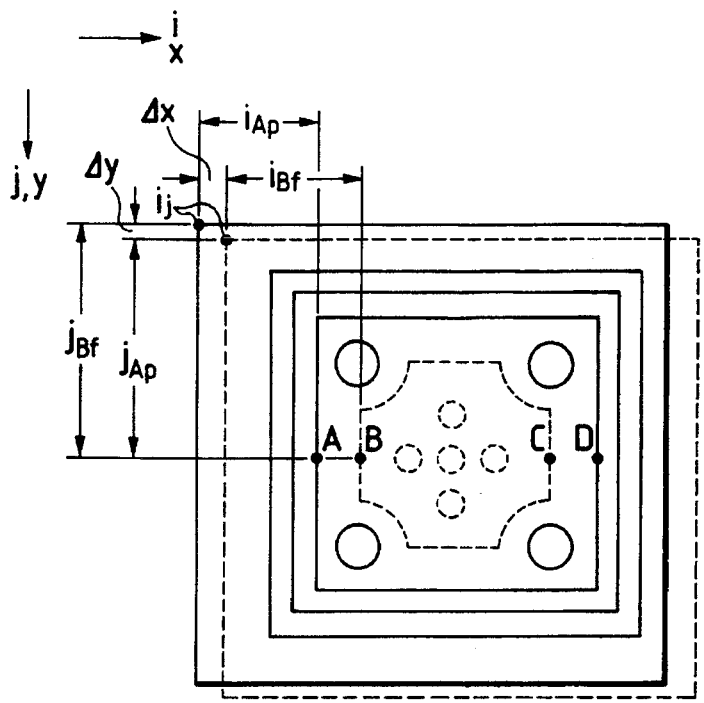
FIG. 8 is a diagrammatic view illustrating the method of converting the coordinates of the position of an objective portion in an image into those on an absolute coordinate system.

After the position of each objective portion in the polarization image has been calculated, the controller 19 controls the moving mechanism 22 to set the optical filters 12 and 15 and the half mirror 13 for obtaining the fluorescence image. Then, the position of each objective portion in the fluorescence image is calculated by the same procedure as that used for calculating the position of each objective portion in the polarization image. Thus, positions of the objective portions in the polarization image and the fluorescence image necessary for calculating the sizes of portions of the hybrid integrated circuit chip 14 are calculated. For example, as shown in FIG. 8, when the coordinates of points A and D in the polarization image are (iAp, jap) and (iDp and jDp), respectively, and t2he coordinates of points B and C (pixels) in the fluorescence image are (iBf, jBf) and (iCf, jCf), respectively, these coordinates are converted into those of an absolute coordinate system (unit: millimeter) having an offset ⌂x, ⌂y). For example, the respective absolute coordinates (xA, yA) and (xB, yB) of the points A and B are calculated by using the following expressions (1) to (4).

$$xA = iAp \times pxp \qquad (1)$$

$$yA = jap \times Pyp \qquad (2)$$

$$xB = iBf \times pxf - ''x \quad (3)$$

$$yB = iBf \times pyf - ''y \quad (4)$$

where Pxp, Pyp, Pxf and Pyf are the sizes in millimeter of pixels in the polarization image (indicated by a suffix "p") and the fluorescence image (indicated by a suffix "f") in a direction i (indicated by a suffix "x") and a direction j (indicated by a suffix "y"), respectively, and ''x and ''y are dislocations (offsets) in millimeter of the origins of ij coordinate system for the polarization image and the fluorescence image on an objective plane. The size of pixels and the dislocations are stored beforehand in the storage device 21. Suppose that the coordinates of the points C and D on the absolute coordinate system are (xC, yC) and (xD, yD). Then, distances between the points A and B, between the points A and D and between the points B and C are xB −xA, xD−xA and xB−xC, respectively.

The measuring method for measuring the sizes of portions of the circuit pattern formed on the hybrid integrated circuit chip, and the measuring apparatus for carrying out the method are effective when the hybrid integrated circuit chip is not very large. Recently, the size of the hybrid integrated circuit chip and the density of elements formed on the hybrid integrated circuit chip have been progressively increased. When the hybrid integrated circuit chip is relatively large, the image of the hybrid integrated circuit chip cannot be processed in a sufficiently high accuracy and a large amount of data needs to be processed. Therefore, the measuring apparatus must be provided with hardware of a large scale, which makes the measuring apparatus expensive and the measuring apparatus needs much time for processing the image.

Figure 9:
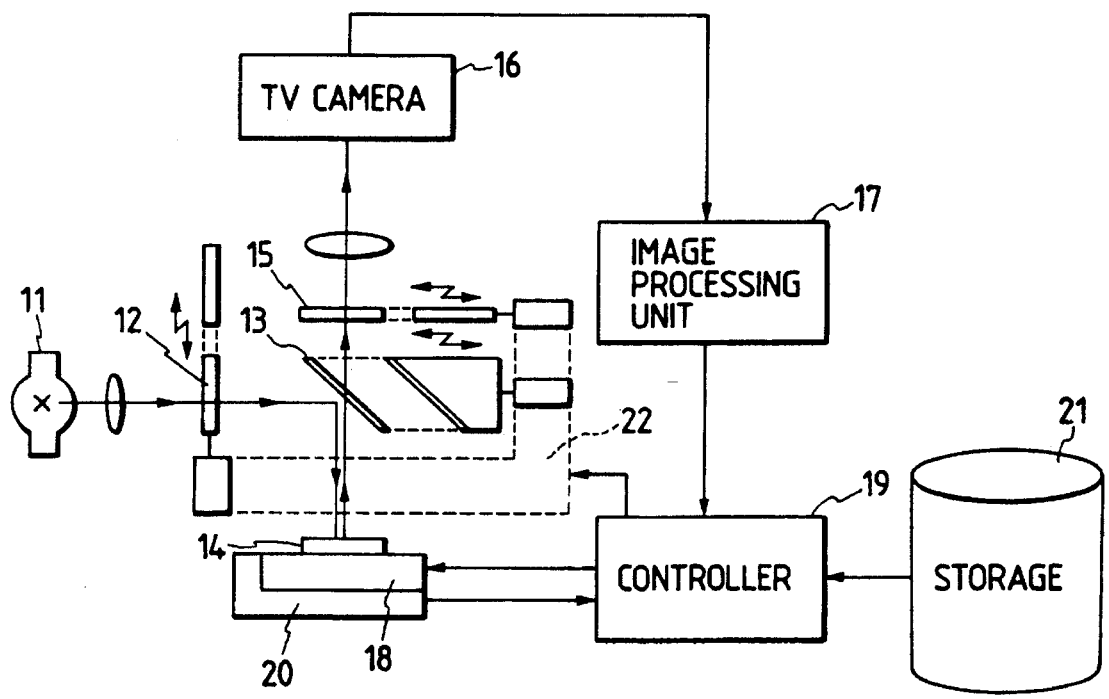
FIG. 9 is a block diagram of a measuring apparatus for measuring an integrated circuit chip, of a second embodiment according to the present invention.

FIG. 9 shows a measuring apparatus of a second embodiment according to the present invention, capable of efficiently and accurately measuring the sizes of portions of a circuit pattern formed on a large hybrid integrated circuit chip. The substantial difference of the measuring apparatus of FIG. 9 from the measuring apparatus of FIG. 1 is that the former measuring apparatus obtains a plurality of partial images of different portions of a chip, including objective portions, and calculates the sizes of the objective portions using the positions of the objective portions in the partial images and the relation between the positions of the partial images. Each objective portion is extracted automatically from the partial image, a reference point is determined on one outline of a pattern within the partial image, an approximate position of the objective portion is determined on the basis of the coordinates of the reference point and design values, the pattern is traced starting from the approximate position of the objective portion as a starting point.

Referring to FIG. 9, the measuring apparatus of the second embodiment comprises, as principal components, a light source 11, optical filters 12 and 15, half mirrors 13, a TV camera 16, an image processing unit 17, a controller 19 and a moving mechanism 22, which are the same as those of the measuring apparatus of the first embodiment of FIG. 1. The measuring apparatus of the second embodiment differs greatly from that of FIG. 1 in the following respects. A large hybrid integrated circuit chip 14 is mounted fixedly on an XY stage 18 and the position of the integrated circuit chip 14 is controlled by the controller 19. The position of the XY stage 18 is determined by a stage position measuring device 20 combined with the XY stage 18. The size of each objective portion of the hybrid integrated circuit chip 14 is calculated using the position of the objective portion in the partial image of the hybrid integrated circuit chip 14 and the position of the XY stage 18 determined by the stage position measuring device 20. The stage position measuring device 20 may be any suitable measuring device meeting required measuring accuracy, such as a linear scale comprising a glass plate provided with a pattern of stripes arranged at a specified pitch and an optical reader for reading the pattern or a laser length measuring machine using the interference of reflected laser light.

The operation of the measuring apparatus for measuring the size al of a pattern formed on the hybrid integrated circuit chip will be described hereinafter.

Figure 10:
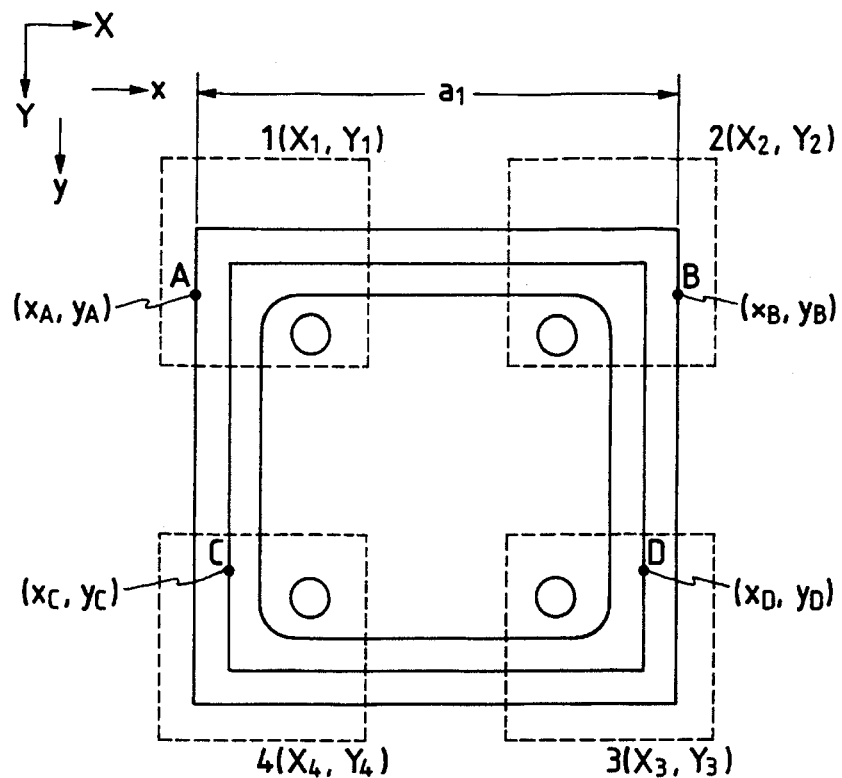
FIG. 10 is a diagrammatic view illustrating the measuring method to be carried out by the measuring apparatus of FIG. 9.

The position of the XY stage 18 is adjusted to position the hybrid integrated circuit chip 14 with respect to the optical axis of the measuring apparatus, four corners are determined, a partial image of an objective portion is obtained on the imaging system suitable for obtaining the image of the objective portion and the absolute coordinates of points on the image of the objective portion are determined by the foregoing procedure. For example, suppose that the absolute coordinates in millimeter of points A, B, C and D shown in FIG. 10 in the partial image are (xA, yA), (xB, yB), (xC, yC) and (xD, yD), respectively, the coordinates in millimeter of the corners represented by the coordinates of positions of the XY stage 18 are (X1, Y1), (X2, Y2), (X3, Y3), and (X4, Y4), respectively. The respective x-coordinates of the points A and B on the absolute coordinate system are X1+xA and X2 + xB. Therefore, the size al of a portion extending across a plurality of partial images is the difference between the respective X-coordinates of the points A and B, which is calculated by using an expression (5).

$$al = (X2 + xB) - (X1 + xA) \quad (5)$$

The sizes of other portions can be calculated by similar procedures. The i-axis of the coordinate system for the image and the x-axis of the coordinate system for the XY stage 18 are parallel to each other, the j-axis of the coordinate system for the image and the y-axis of the coordinate system for the XY stage 18 are parallel to each other. The direction of the TV camera 16 coincides with the direction of movement of the XY stage 18.

Since the measuring apparatus of the second embodiment shown in FIG. 9 obtains an enlarged partial image of an objective portion, the size of the objective portion can be measured in a high accuracy comparable to the accuracy of measurement in which the size the objective portion is measured by using an image of the entire hybrid integrated circuit chip formed in high resolution.

Although the measuring method and the measuring apparatus of the first and second embodiments have been described as applied to measuring the respective sizes of objective portions of the hybrid integrated circuit chip, it is also possible to sort nonconforming hybrid integrated circuit chips from conforming hybrid integrated circuit chips by comparing measured values with specified criteria. In this case, the size of the selected portion of the hybrid integrated circuit chip is compared with a predetermined value and the difference between them is calculated. Then the chip is determined to be good if all of the calculated differences are within criteria which are specified to the selected portions respectively, and[ as bad otherwise. Finally the good chip is permitted to be selected to proceed to a successive production process. The present invention is applicable also to a positioning apparatus. The combined use of the polarized light illumination/detection system and the fluorescence detection system in accordance with the present invention and the method of correcting the coordinates are applicable to the inspection of other portions of the hybrid integrated circuit chip. In modifications, the present invention may be realized in automatic sorting apparatus, automatic positioning apparatus, and automatic inspection apparatus.

As is apparent from the foregoing description, the measuring methods and the measuring apparatuses of the first and second embodiments are capable of quickly, automatically and accurately measuring the sizes of portions of a hybrid integrated circuit chip and those of portions of patterns formed in the hybrid integrated circuit chip, measuring the sizes of portions of a hybrid integrated circuit chip and those of portions of patterns formed on the hybrid integrated circuit chip even if the hybrid integrated circuit chip is relatively large, and measuring the sizes of ! portions of a hybrid integrated circuit chip and those of portions of patterns formed on the hybrid integrated circuit chip, and of sorting conforming hybrid integrated circuit chips from nonconforming hybrid integrated circuit chips on the basis of measured values.

The methods and apparatuses of the first and second embodiments are also capable of quickly, automatically and accurately measuring the sizes of portions of a hybrid integrated circuit chip and those of portions of patterns formed on the hybrid integrated circuit chip even if the hybrid integrated circuit chip is relatively large and of sorting conforming hybrid integrated circuit chips from nonconforming hybrid integrated circuit chips on the basis of the measured values.

Figure 11:
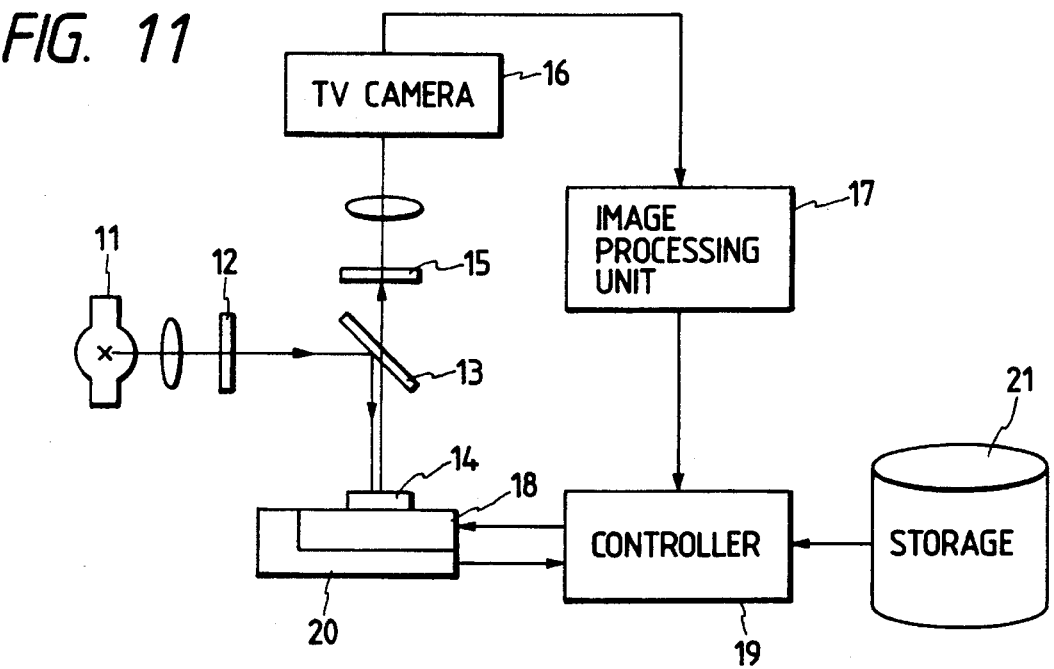
FIG. 11 is a block diagram of a measuring apparatus of a third embodiment according to the present invention.

FIG. 11 is a measuring apparatus of a third embodiment according to the present invention for carrying out a measuring method in accordance with the present invention.

An image forming system comprises a light source 111, such as a mercury lamp, optical filters 112 and 115, a semitransparent mirror 113 and a TV camera 116. Illuminating light emitted by the light source 111 travels through the optical filter 112 and is reflected by the semitransparent mirror 113 toward a wiring board 1.14, i.e., a measuring object, to illuminate the wiring board 114.. The reflected light reflected by the wiring board 114 travels through the semitransparent mirror 113 and the optical filter 115 and falls on the TV camera 116. Then, image signals provided by the TV camera 116 are sampled in synchronism with a clock signal of a fixed frequency and converted into corresponding digital image signals serving as density data. The digital image signals are stored temporarily in a storage device included in an image processing unit 117. The image processing unit 117 processes the digital image signals by an image processing procedure, which will be described later, to calculate the position of an objective portion. The wiring board 114 is fixedly mounted on an XY stage 118. The position of the XY stage 118 can be controlled and measured. All the operations of the measuring apparatus is controlled by a controller 119. The XY stage 118 is moved, images are acquired, the image processing unit 117 processes the image signals, and the size of each objective portion of the wiring board 114 is calculated by a procedure, which will be described later, on the basis of the position of the objective portion in the image and the position of the XY stage 118 determined by a stage position measuring device 120.

The optical filters 112 and 1.15 and the semitransparent mirror 113 have characteristics capable of forming an image of the measuring object in a high contrast. For example, when a metallic pattern formed on a ceramic plate which diffuses light is a measuring object, an image having a dark portion corresponding to the metallic pattern and a bright portion corresponding to a portion other than the metallic pattern can be obtained when polarizing plates are employed as the optical filters 112 and 115, and a half mirror is employed as the semitransparent mirror 113 to illuminate the wiring board 114 with polarized light and to detect the reflected light having a polarizing direction perpendicular to that of the polarized light for illumination.

When a metallic pattern of a printed wiring board, formed of an organic resin plate is a measuring object, an image having a dark portion corresponding to the metallic pattern and a bright portion corresponding to a portion other than the metallic pattern can be obtained when a band-pass filter having a center transmission wavelength on the order of 450 nm is employed as the optical filter 112. A colored glass filter that transmits light of wavelengths not shorter than 550 nm is employed as the optical filter 115 and a dichroic mirror that reflects light of wavelengths shorter than 500 nm and transmits lights of wavelengths not shorter than 500 nm is employed as the semitransparent mirror 113.

If the objective portions have different colors, respectively, colored glass filters may be employed as the optical filters 112 and 115 to obtain an image having a high contrast. An ND filter may be used simply for regulating the quantity of light to be detected. The measuring method and the measuring apparatus of the present invention may employ any image forming means capable of forming a high-contrast image of a measuring object. The TV camera 116 may be substituted by other two-dimensional imaging device. The two-dimensional imaging method may employ X-rays or electron beams. The magnification of the imaging system, i.e., the size of the pixel of the image, is dependent on the required accuracy.

The image processing unit 117 may be any suitable image processing means, provided that the image processing means is provided with an image storage device; that is, the image processing unit 117 may be a microprocessor that carries out software to process image signals or may be hardware or a combination of software and hardware. The controller 119 is, for example, a computer system provided with a microprocessor as a principal component. A storage device 121 storing data including design data representing the positions of the objective portions and the size of the pixel is connected to the controller 119. The stage position measuring device 120 may be any suitable measuring device meeting required measuring accuracy, such as an optical linear scale comprising a glass plate provided with a pattern of stripes arranged at a specified pitch and an optical reader for reading the pattern or a laser length measuring machine using the interference of reflected laser light.

A procedure of the measuring method of the third embodiment of the present invention and the operation of the measuring apparatus of the present invention will be described hereinafter.

Figure 12:
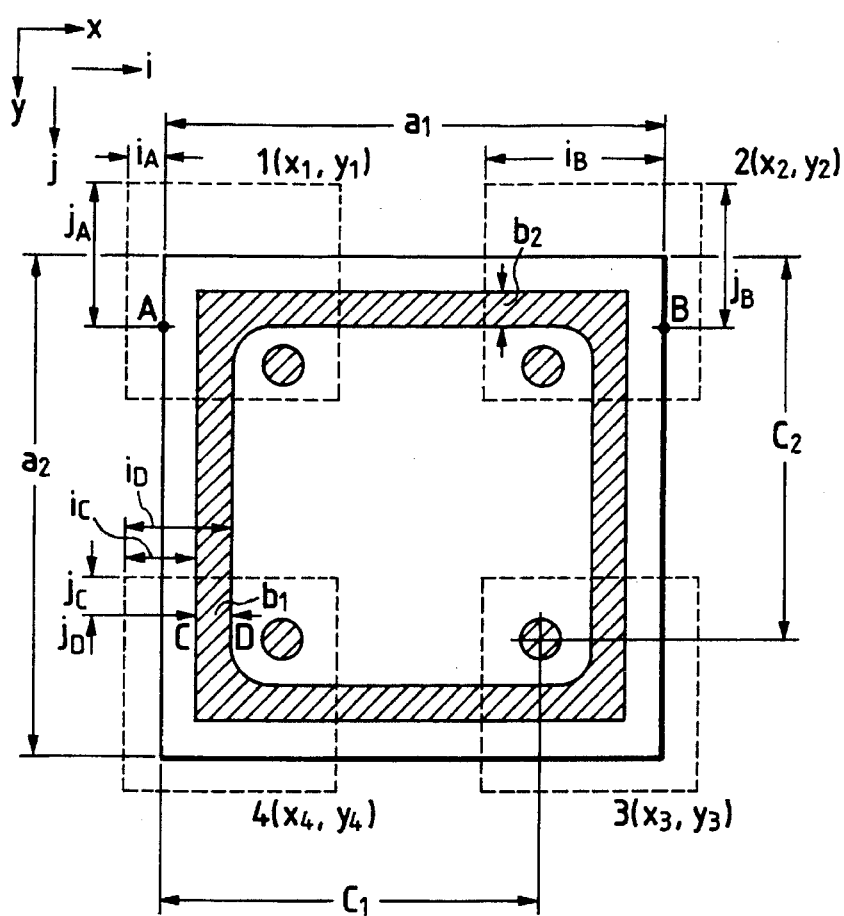
FIG. 12 is a plan view of a wiring board as a measuring object.

The measuring method and the operation of the measuring apparatus of the third embodiment will be described as applied to measuring the outside sizes $a_1$ and $a_2$ of the wiring board, the respective sizes $b_1$ and $b_2$ of portion of the wiring pattern, and the respective positions $C_1$ and $C_2$ of portions of the wiring pattern as shown in FIG. 12.

The position of the XY stage 118 is adjusted to position the wiring board with respect to the optical axis of the measuring apparatus, images of the four corners of the wiring board are obtained and the positions of the objective portions in the image are determined by a procedure, which will be described later. For example, suppose that the respective coordinates (unit: pixel) of points A, B, C and D shown in FIG. 12 in the images are $(i_A, j_A)$, $(i_B, j_B)$, $(i_C, j_C)$ and $(i_D, i_D)$, and the respective coordinates (unit: mm) of the positions of the XY stage 118 when the four coroners are positioned on the optical axis of the measuring apparatus are $(x_1, y_1)$, $(x_2, y_2)$, $(x_3, y_3)$ and $(x_4, y_4)$, and the size (mm) of the pixel along an i-axis and that of the same along a j-axis are px and py. Then, the outside size a1, for example, is expressed by:

$$a_1 = (x_2 + i_B \times px) \quad (x_1 + i_A \times px) \quad (1)$$
$$= (x_2 - x_1) + (i_B - i_A) \times px$$

and the size $b_1$ of a portion of the pattern in the image is expressed by:

$$b_1 = (i_D - i_C) \times px \quad (2)$$

The rest of the sizes can be calculated by using similar expressions. The values px and py are predetermined values stored beforehand in the storage device 121. The direction of the TV camera 116 and the direction of movement of the XY stage 118 coincide with each other so that the i-axis and the x-axis are parallel to each other and the j-axis and the y-axis are parallel to each other.

Figure 13:
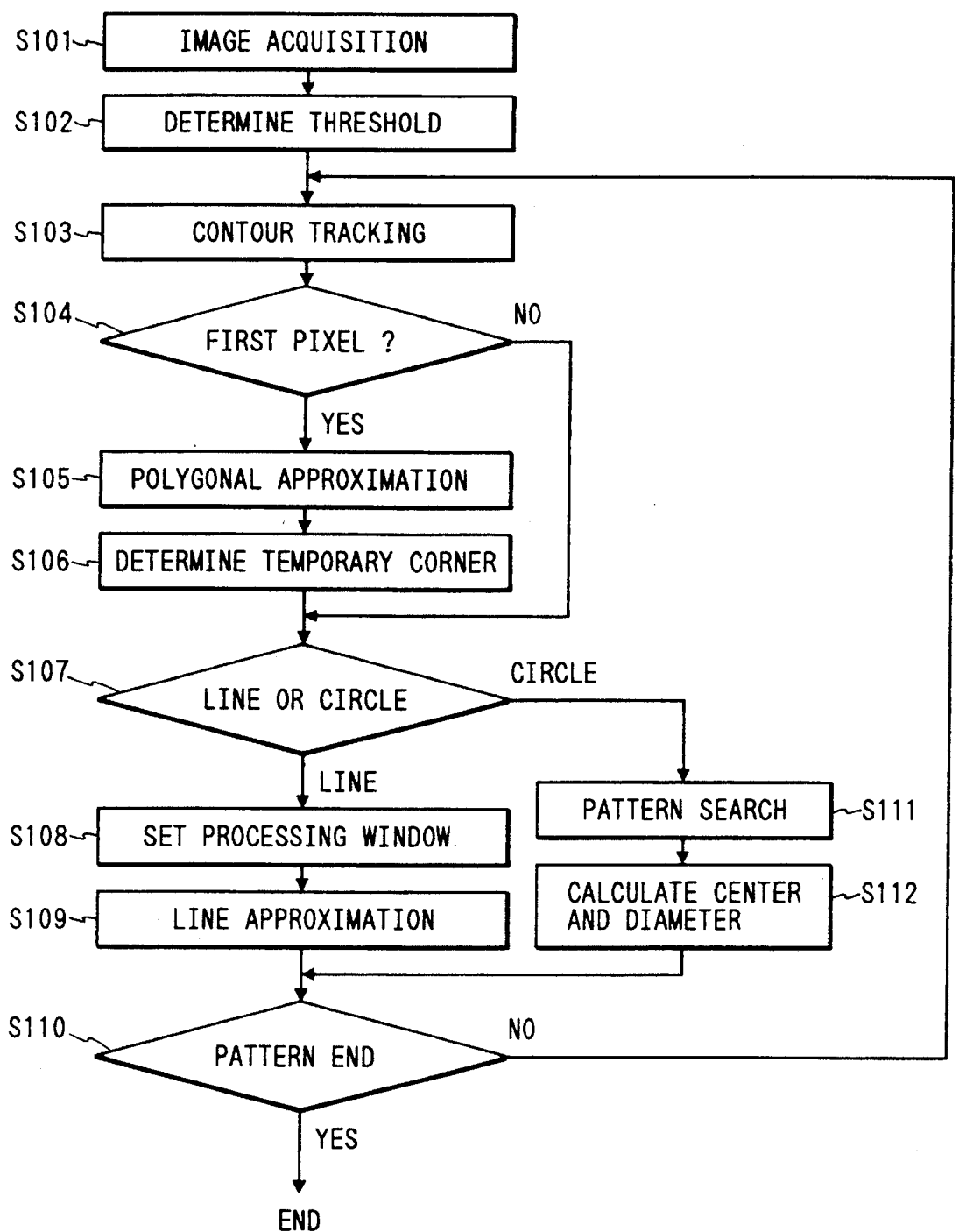
FIG. 13 is a flow chart of an image processing procedure.

A procedure of determining the position of the objective portion in each image will be described with reference to FIG. 13 showing the procedure in a flow chart.

The image processing unit 117 produces a density distribution curve, i.e., a histogram, of the densities of the entire image or the partial image of a section including the objective portion namely image acquisition (step S101), and determines a threshold for binarization on the basis of the density distribution curve (step S102).

Figure 14:
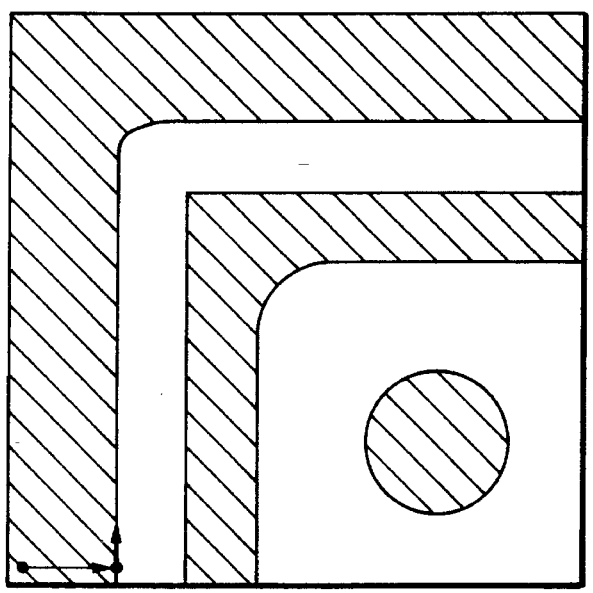
FIG. 14 is a fragmentary plan view illustrating the image processing procedure.
Figure 15A:
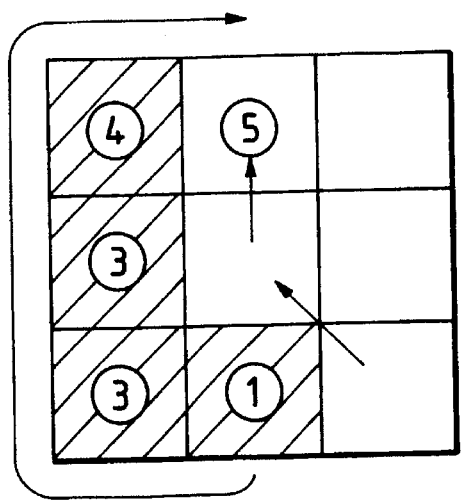
FIGS. 15A, 15B and 15C are a diagrammatic views illustrating the method of tracing a contour.
Figure 15B:
Figure 15C:

Then, as shown in FIG. 14, pixels are scanned along a direction from a point outside the wiring board toward the wiring board to examine the data of the pixels to find the first pixel having density data greater than (or smaller than) the threshold. Then, the contour of the pattern is traced starting from the first pixel (step S103). In tracing the pattern, eight pixels (or four pixels) around an objective pixel are examined successively in a clockwise or counterclockwise sequence, starting from the preceding pixel as shown in FIGS. 15A–C, and the first pixel having density data greater than (or smaller than) the threshold is selected as the next objective pixel, and the coordinates of the objective pixel are stored in the storage device. This procedure is repeated.

Figure 16:
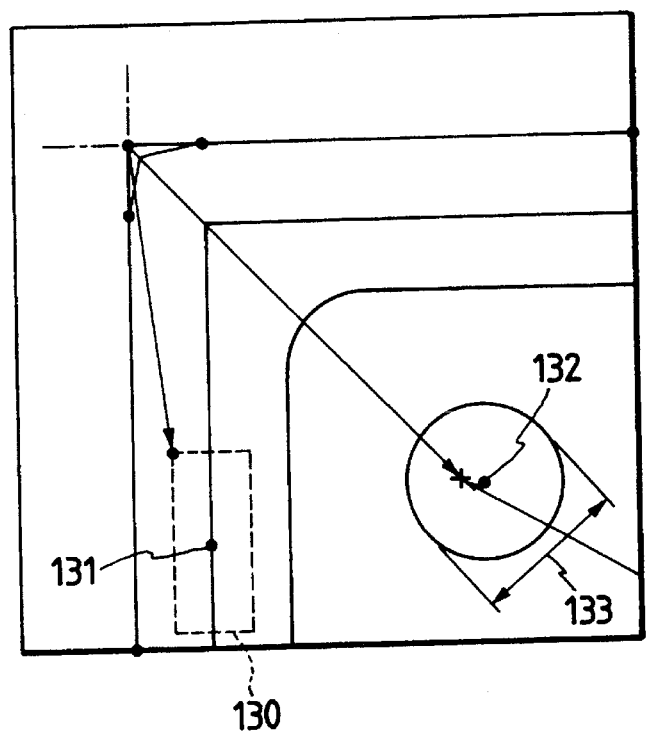
FIG. 16 is a diagrammatic view illustrating the procedure of determining a position in an image.

Then, as shown in FIG. 16, the contour is approximated by a polygonal line (step S105), and the intersection point of the extension of a portion of the polygonal line inclined to a horizontal line at an angle smaller than a reference value and the extension of a portion of the polygonal line inclined to a vertical line at an angle smaller than a reference value is assigned to a temporary corner (step S106). If the first pixel is being evaluated then steps S105 and S106 are skipped (step S104).

The temporary corner is used as a reference point for determining the position of the objective portion in the image. Thus, a measuring region in each image is determined on the basis of a distance from the temporary corner stored beforehand in the storage device 121, and the objective portion is measured (steps S107, S108, S111 and S112). For example, if the objective portion is the edge of the wiring board or a straight portion of the wiring pattern, a rectangular measuring window 130 is set (steps S107 and S108) in the image by the foregoing procedure, a portion of the contour within the measuring window 130 is approximated by a straight line, and the position of the objective portion in the image is represented by the middle point 131 on the straight line within the window 130. If the objective portion is a circle, the position of the objective portion in the image is represented by, for example, the centroid 132 of a pattern including the point determined on the basis of the temporary corner, and the diameter 133 of the pattern is determined on the basis of the area of the pattern (steps S107, S111 and S112). Step S107 determines whether a straight line or circle has been encountered. Then the end of the pattern is detected (step S110). If the end of the pattern is not detected steps S103–S112 are repeated.

The third embodiment of the present invention processes an image to extract an objective portion and calculates the size of the objective portion by the predetermined procedure with reference to the predetermined reference point. Therefore, measurement can be quickly achieved in satisfactory reproducibility and in high accuracy.

Since enlarged partial images of sections of the measuring object are obtained, measurement can be easily carried out in a high accuracy as compared with measurement using an image having high resolution of the entire measuring object.

While the present invention has been described according to what are considered at present to be preferred embodiments of the invention, it will be understood that various modifications may be made thereto without departing from the spirit and scope of the invention.

We claim:

1. A method of measuring sizes of objective portions of a circuit of a ceramic material provided with an organic thin-film circuit pattern thereon, said method comprising the steps of:

obtaining a first image of the circuit by illuminating the circuit with linearly polarized illuminating light and detecting reflected light having a direction of vibration perpendicular to that of the linearly polarized illuminating light;

obtaining a second image of the circuit by illuminating the circuit with monochromatic illuminating light having a short wavelength and detecting fluorescence produced by the circuit and having a wavelength longer than that of the monochromatic illuminating light;

selecting either the first image or the second image as the image of objective portions of the circuit;

calculating positions of the objective portions in the selected image;

converting coordinates of the positions of the objective portions in the selected image into coordinates of an absolute coordinate system based on a relation between the coordinates of the objective portions in the selected image and coordinates of the absolute coordinate system; and determining a size of an arbitrary objective portion by calculating a difference between coordinates in the absolute coordinate system of two objective portions.

2. A method according to claim 1 wherein said circuit is a hybrid integrated circuit chip.

3. A method according to claim 1 further comprising the steps of:

rejecting said circuit if said difference exceeds a predetermined value.

4. A method according to claim 1 wherein said calculated difference represents a difference between an objective portion of the first image and an objective portion of the second image.

5. A method according to claim 1 further comprising the steps of:

determining a position of each objective portion in the selected image including the steps of:

determining a reference point by tracing a contour of a predetermined pattern in the selected image, and calculating the position based on coordinates of the reference point, and a contour near the position of the objective portion represented by design values stored in a storage device.

6. A method according to claim 5 wherein said circuit is a hybrid integrated circuit.

7. A method according to claim 5 wherein said calculated difference is a difference between an objective portion of the first image and an another objective portion of the second image.

8. A method according to claim 5 wherein said circuit is rejected when said difference exceeds a predetermined value.

9. An apparatus for measuring sizes of objective portions of a circuit of a ceramic material provided with an organic thin-film circuit pattern thereon, comprising:

first illuminating means for obtaining a first image of the circuit by illuminating the circuit with linearly polarized illuminating light and detecting reflected light having a directional vibration perpendicularly to that of the linearly polarized illuminating light;

second illuminating means for obtaining a second image of the circuit by illuminating the circuit with monochromatic illuminating light having a shortwave length and detecting fluorescence produced by the circuit and having a wavelength longer than that of the monochromatic illuminating light;

selecting means for selecting either the first image or the second image as the image of a plurality of objective portions of the circuit; and means for calculating positions of the objective portions in the selected image, converting coordinates of the positions of the objective portions in the selected image into coordinates of an absolute coordinate system based on a relation between the coordinates of the objective portions in the selected image and coordinates of the absolute coordinate system, and determining a size of an arbitrary objective portion by calculating a difference between coordinates in the absolute coordinate system of two objective portions.

10. An apparatus according to claim 9 wherein said circuit is a hybrid integrated circuit chip.

11. An apparatus according to claim 9 wherein said circuit is rejected when said difference exceeds a predetermined value.

12. An apparatus according to claim 9 wherein said calculated difference represents a difference between an objective portion of the first image and an objective portion of the second image.

13. The apparatus according to claim 9 wherein said means for calculating determines a position of each objective portion in the selected image, said means for calculating comprises:

means for determining a reference point by tracing a contour of a predetermined pattern in the selected image; and means for calculating a position based on coordinates of the reference point and a contour near the position of the objective portion represented by design values stored beforehand in a storage device.

14. An apparatus according to claim 13 wherein said circuit is a hybrid integrated circuit chip.

15. An apparatus according to claim 13 wherein said circuit is rejected when said difference exceeds a predetermined value.

16. An apparatus according to claim 13 wherein said calculated difference represents a difference between an objective portion of the first image and an objective portion of the second image.

17. An apparatus for measuring the sizes of objective portions of a circuit of a ceramic material provided with an organic thin-film circuit pattern thereon, said apparatus comprising:

a first illuminating means for illuminating the hybrid integrated circuit chip with linearly polarized light;

a second illuminating means for illuminating the hybrid integrated circuit chip with monochromatic light having a short wavelength;

a first filtering means for extracting the reflected light having a direction of vibration perpendicular to that of the illuminating light emitted by the first illuminating means;

a second filtering means for extracting the fluorescence produced by the hybrid integrated circuit chip and having a wavelength longer than that of the monochromatic light emitted by the second illuminating means;

an optical system changing means for positioning either the combination of the first illuminating means and the first filtering means or the combination of the second illuminating means and the second filtering means on a light path;

an imaging means for converting optical image signals extracted by either the first filtering means or the second filtering means into electrical image signals;

an image processing means for determining positions of objective portions in the image of the combination of the first illuminating means and the first filtering means and the combination of the second illuminating means and the second filtering means of the circuit based on electrical image signals provided by the imaging means; and an arithmetic means for converting coordinates of each objective portion in the image into those of an absolute coordinate system based on a relation between positions in each of the images obtained by the combination of the first illuminating means and the first filtering means and the combination of the second illuminating means and the second filtering means, and the absolute coordinate system, and determining a size of an arbitrary objective portion by calculating a difference between coordinates of two objective portions on the absolute coordinate system.

18. A method of measuring the sizes objective portions of a relatively large hybrid integrated circuit chip of a ceramic material provided with an organic thin-film circuit pattern thereon, said method comprising the steps of:

moving the hybrid integrated circuit chip to position objective portions of the hybrid integrated circuit chip at a measuring position;

obtaining partial images of portions of the hybrid integrated circuit chip, including the objective portions, on either a polarized light illumination/detection system which illuminates the hybrid integrated circuit chip with linearly polarized light and converts the reflected light having a direction of vibration perpendicular to that of the linearly polarized light into electrical image signals or a fluorescence detection system which illuminates the hybrid integrated circuit chip with monochromatic light, and converts the fluorescence produced by the hybrid integrated circuit chip and having a wavelength longer than that of the monochromatic light into electrical image signals;

converting the positions of the objective portions in the partial images into corresponding coordinates on an actual coordinate system based on the relation between positions in the partial images measured beforehand for the polarized light illumination/detection system and the fluorescence detection system, and actual coordinates; and determining a size of an arbitrary objective portion by calculating a difference between coordinates of two objective portions on the actual coordinate system based on the coordinates on the actual coordinate system and the positions of the partial images.

19. A method according to claim 18 further comprising the steps of:

determining a position of each objective portion in the partial image including the steps of:
setting a reference point by tracing a contour of a predetermined pattern in the partial image, and
calculating a position based on the coordinates of the reference point, and a contour near the position of the objective portion represented by design values stored beforehand in a storage device.

20. An apparatus for measuring sizes of objective portions of a relatively large hybrid integrated circuit chip of a ceramic material provided with an organic thin-film circuit pattern thereon, said apparatus comprising:

an XY stage for supporting the hybrid integrated circuit chip thereon to position tire hybrid integrated circuit chip for measurement;

a first illuminating means for illuminating the hybrid integrated circuit chip mounted on the XY stage with a linearly polarized light;

a second illuminating means for illuminating the hybrid integrated circuit chip mounted on the XY stage with monochromatic light having a short wavelength;

a first filtering means for extracting the reflected light having a direction of vibration perpendicular to the direction of vibration of the linearly polarized light;

a second filtering means for extracting the fluorescence produced by the hybrid integrated circuit chip and having a wavelength longer than the monochromatic light emitted by the second illuminating means;

an optical system changing means for positioning either the combination of the first illuminating means and the first filtering means or the combination of the second illuminating means and the second filtering means on a light path;

an imaging means for converting optical image signals extracted by either the first filtering means or the second filtering means into electrical image signals; an image processing means for determining positions of objective portions in the image of the hybrid integrated circuit chip based on the electrical image signals provided by the imaging means; and an arithmetic means for converting coordinates of each objective portion in the image into those on an absolute coordinate system based on a relation between positions determined beforehand in each of the images obtained by a combination of the first illuminating means and the first filtering means and a combination of the second illuminating means and the second filtering means, and the absolute coordinate system, and determining a size of an arbitrary objective portion by calculating a difference between respective coordinates of two objective portions on the absolute coordinate system.

21. A method of examining objective portions of a hybrid integrated circuit chip of a ceramic material provided with an organic thin-film circuit pattern thereon to determine whether a size of each objective portion is within an allowable range of size, said method comprising the steps of:

obtaining a first image of the hybrid integrated circuit chip by illuminating the hybrid integrated circuit chip with linearly polarized light and detecting the reflected light having a direction of vibration perpendicular to that of the linearly polarized light;

obtaining a second image of the hybrid integrated circuit chip by illuminating the hybrid integrated circuit chip with monochromatic light having a short wavelength and detecting the fluorescence produced by the hybrid integrated circuit chip and having a wavelength longer than that of the monochromatic light;

selecting either the first image or the second image for a plurality of objective portions of the hybrid integrated circuit chip;

calculating positions of the objective portions in the selected image based on the selected image;

converting the coordinates of the positions of the objective portions in the image into those of an absolute coordinate system based on a relation between the coordinates of the objective portions in the first and second images, determined beforehand and the coordinates of the same on the absolute coordinate system; and determining a size of arbitrary objective portion by calculating a difference between respective coordinates of two objective portions on the absolute coordinate system.

22. An apparatus for examining objective portions of a hybrid integrated circuit chip of a ceramic material provided with an organic thin-film circuit pattern thereon to determine whether a size of each objective portion is within an allowable range of size, said apparatus comprising:

a first illuminating means for illuminating the hybrid integrated circuit chip with a linearly polarized light;

a second illuminating means for illuminating the hybrid integrated circuit chip with monochromatic light having a short wavelength;

a first filtering means for extracting the reflected light having a direction of vibration perpendicular to that of the linearly polarized light;

a second filtering means for extracting the fluorescence produced by the hybrid integrated circuit chip and having a wavelength longer than that of the monochromatic light;

an optical system changing means for positioning either the combination of the first illuminating means and the first filtering means or the combination of the second illuminating means and the second filtering means on a light path;

an imaging means for converting optical image signals extracted by either the first filtering means or the second filtering means into electrical image signals;

an image processing means for determining the positions of objective portions in the image of the hybrid integrated circuit chip on the basis of electrical image signals provided by the imaging means; and an arithmetic means for converting coordinates of each objective portion in the image into those on an absolute coordinate system based on a relation between positions determined beforehand in each of the images obtained by a combination of the first illuminating means and the first filtering means and a combination of the second illuminating means and the second filtering means, and the absolute coordinate system, determining a size of an arbitrary objective portion by calculating a difference between respective coordinates of two objective portions on the absolute coordinate system, and deciding whether the size is within an allowable range of size.

23. A method of examining objective portions of a hybrid integrated circuit chip of a ceramic material provided with an organic thin-film circuit pattern thereon to determine whether a size of each objective portion is within an allowable range of size, said method comprising the steps of:

moving the hybrid integrated circuit chip to position objective portions of the hybrid integrated circuit chip at a measuring position;

obtaining partial images of portions of the hybrid integrated circuit chip, including the objective portions, on either a polarized light illumination/detection system which illuminates the hybrid integrated circuit chip with linearly polarized light and converts the reflected light having a direction of vibration perpendicular to that of the linearly polarized light into electrical image signals or a fluorescence detection system which illuminates the hybrid integrated circuit chip with monochromatic light and converts the fluorescence produced by the hybrid integrated circuit chip and having a wavelength longer than that of the monochromatic light into electrical image signals;

calculating positions of the objective portions in the partial images;

converting the positions of the objective portions in the partial images into corresponding coordinates on an actual coordinate system based on a relation between positions in the partial images measured beforehand for the polarized light illumination/detection system and the fluorescence detection system, and actual coordinates;

determining a size of an arbitrary objective portion by calculating a difference between coordinates of two objective portions on the actual coordinate system based on the coordinates on the actual coordinate system and the positions of the partial images; and deciding whether the size is within an allowable range of size.

24. An apparatus for examining objective portions of a hybrid integrated circuit chip or a ceramic material provided with an organic thin-film circuit pattern thereon to determine whether a size of each objective portion is within an allowable range of size, said apparatus comprising:

an XY stage for supporting the hybrid integrated circuit chip thereon to position the hybrid integrated circuit chip for measurement;

a first illuminating means for illuminating the hybrid integrated circuit chip with a linearly polarized light;

a second illuminating means for illuminating the hybrid integrated circuit chip with monochromatic light having a short wavelength;

a first filtering means for extracting the reflected light having a direction of vibration perpendicular to that of the linearly polarized light;

a second filtering means for extracting the fluorescence produced by the hybrid integrated circuit chip and having a wavelength longer than that of the monochromatic light emitted by the second illuminating means;

an optical system changing means for positioning either the combination of the first illuminating means and the first filtering means or the combination of the second illuminating means and the second filtering means on a light path;

an imaging means for converting optical image signals extracted by either the first filtering means or the second filtering means into electrical image signals;

an image processing means for determining positions of objective portions in the image of the hybrid integrated circuit chip based on the electrical image signals provided by the imaging means; and an arithmetic means for converting coordinates of each objective portion in the image into those of an actual coordinate system based on the relation between positions determined beforehand in each of the images obtained by the a combination of the first illuminating means and the first filtering means and a combination of the second illuminating means and the second filtering means, and the actual coordinate system, determining a size of an arbitrary objective portion by calculating a difference between the respective coordinates of two objective portions on the actual coordinate system, and deciding whether the size is within an allowable range of sizes.

25. A method of measuring sizes of objective portions of a wiring board of a first material provided with a wiring pattern thereon of a second material, said method comprising the steps of:

obtaining a first two-dimensional partial image of an area of the wiring board by illuminating the wiring board with a first light and detecting a first reflected light reflected from the first material by the first light;

obtaining a second two-dimensional partial image of the area of the wiring board by illuminating the wiring board with a second light and detecting a second reflected light reflected from the second material by the second light;

selecting either the first two-dimensional partial image of the first material or the second two-dimensional partial image of the second material which includes objective portions of the wiring board;

calculating positions of the objective portions in the selected image;

converting coordinates of positions of the objective portions in the selected image into coordinates of an absolute coordinate system based on a relation between the coordinates of the absolute coordinates system in the selected image and coordinates of an objective coordinate system; and determining a size of an arbitrary objective portion in the selected image by calculating a difference between coordinates in the absolute coordinate system of two arbitrary objective portions in the selected image.

26. A method of measuring the size of a wiring pattern formed on a wiring board according to claim 25, wherein the position of each objective portion in each image is calculated by detecting a reference point on a contour line of a pattern included in the image, determining an approximate position of the objective portion based on coordinates of the reference point and design data stored beforehand in a storage device, and calculating the position of the objective portion by using a pattern near the approximate position.

27. A method according to claim 25 wherein said circuit chip is a hybrid integrated wiring board.

28. A method according to claim 25 wherein said first material is a ceramic material and said second material is an organic thin-film material.

29. A method of producing a circuit chip of a first material provided with a circuit pattern thereon of a second material, said method comprising the steps of:

obtaining a first image of the circuit chip by illuminating the circuit chip with a first type of light and detecting the reflected light;

obtaining a second image of the circuit chip by illuminating the circuit chip with a second type of light and detecting the reflected light;

selecting either the first image or the second image suitable for detecting a plurality of objective portions of the circuit chip;

calculating positions of the objective portions in the selected image based on the selected image;

converting coordinates of the positions of the objective portions in the selected image into those of an absolute coordinate system based on a relation between coordinates of the objective portions in the first and second images and coordinates of the objective portions in the absolute coordinate system;

determining a size of an arbitrary portion by calculating differences between respective coordinates of predetermined portions of two objective portions on the absolute coordinate system;

calculating a difference between the determined size and a predetermined value;

determining whether the circuit chip is good if all of the calculated differences of the predetermined portions are within predetermined values; and permitting the good circuit chip to proceed to a successive production process.

30. A method according to claim 29 wherein said circuit chip is a hybrid integrated circuit chip.

31. A method according to claim 30 wherein said first material is ceramic material and said second material is an organic thin-film material.

32. A method according to claim 31 wherein said first type of light is linearly polarized illuminating light of which the reflected light has a direction of vibration perpendicular to that of the linearly polarized light and said second type of light is a monochromatic illuminating light having a short wave length of which the reflected light is fluorescence produced by the hybrid integrated circuit chip having a wave length longer than that of the monochromatic illuminating light.

33. A method of measuring sizes of objective portions of a circuit chip of a first material provided with a circuit pattern thereon of a second material, said method comprising the steps of:

obtaining a first image of the circuit chip by illuminating the circuit chip with a first type of light and detecting the reflected light;

obtaining a second image of the circuit chip by illuminating the chip with a second type of light and detecting the reflected light;

selecting either the first image or the second image as the image of objective portions of the circuit chip;

calculating positions of the objective portions in the selected image;

converting coordinates of positions of the objective portions in the selected image into coordinates of an absolute coordinate system based on a relation between the coordinates of the absolute portions in the selected image and coordinates of the objective coordinate system; and determining a size of an arbitrary objective portion by calculating a difference between coordinates in the absolute coordinate system of two objective portions;

wherein said circuit chip is a hybrid integrated circuit chip;

wherein said first material is a ceramic material and said second material is an organic thin-film material;

wherein said first type of light is a linearly polarized illuminating light of which the reflected light has a direction of vibration perpendicular to that of the linearly polarized illuminating light and said second type of light is a monochromatic illuminating light having a short wave length of which the reflected light has fluorescence produced by the circuit having a wavelength longer than that of the monochromatic illuminating light.

34. An apparatus for measuring sizes of objective portions of a wiring board of a first material provided with a wiring pattern thereon of a second material, said method comprising;

first illuminating means for obtaining a first two-dimensional partial image of an area of the wiring board by illuminating the wiring board with a first light and detecting a first reflected light reflected from the first material by the first light;

second illuminating means for obtaining a second two-dimensional partial image of the area of the wiring board by illuminating the wiring board with a second light and detecting a second reflected light reflected from the second material by the second light;

selecting means for selecting either the first two-dimensional partial image of the first material or the second two-dimensional partial image of the second material which includes objective portions of the wiring board; and means for calculating positions of the objective portions in the selected image, converting coordinates of positions of the objective portions in the selected image into coordinates of an absolute coordinate system based on a relation between the coordinates of the absolute coordinate system in the selected image and coordinates of an objective coordinate system, and determining a size of an arbitrary objective portion in the selected image by calculating a difference between coordinates in the absolute coordinate system of two arbitrary objective portions in the selected image.

* * * * *